(12) United States Patent
Tian et al.

(10) Patent No.: US 12,563,258 B2
(45) Date of Patent: Feb. 24, 2026

(54) REAL TIME REWIND PLAYBACK

(71) Applicant: Snap Inc., Santa Monica, CA (US)

(72) Inventors: Dong Tian, Shenzhen (CN); Guanshu Chen, Shenzhen (CN)

(73) Assignee: Snap Inc., Santa Monica, CA (US)

( * ) Notice: Subject to any disclaimer, the term of this patent is extended or adjusted under 35 U.S.C. 154(b) by 83 days.

(21) Appl. No.: 18/118,762

(22) Filed: Mar. 8, 2023

(65) Prior Publication Data

US 2024/0305858 A1 Sep. 12, 2024

(51) Int. Cl.
| | |
|---|---|
| *H04N 21/433* | (2011.01) |
| *G06F 3/04883* | (2022.01) |
| *H04N 19/177* | (2014.01) |
| *H04N 19/426* | (2014.01) |

(52) U.S. Cl.
CPC ..... *H04N 21/4331* (2013.01); *G06F 3/04883* (2013.01); *H04N 19/177* (2014.11); *H04N 19/426* (2014.11)

(58) Field of Classification Search
CPC ............. H04N 21/4331; H04N 19/177; H04N 19/426; G06F 3/04883
USPC ......... 386/239, 343–352, 206, 356; 711/118; 725/94
See application file for complete search history.

(56) References Cited

U.S. PATENT DOCUMENTS

| | | | | |
|---|---|---|---|---|
| 6,222,979 B1* | 4/2001 | Willis | ................ | H04N 21/4325 |
| | | | | 386/350 |
| 7,962,942 B1* | 6/2011 | Craner | ............... | H04N 21/2387 |
| | | | | 725/102 |
| 8,042,140 B2* | 10/2011 | Thomas | ................ | G06F 3/1454 |
| | | | | 725/94 |
| 8,693,848 B1* | 4/2014 | Pacor | ............... | H04N 21/21805 |
| | | | | 386/296 |
| 2005/0141861 A1* | 6/2005 | Dunbar | .................. | H04N 5/783 |
| | | | | 386/E5.052 |
| 2008/0055484 A1* | 3/2008 | Lim | ........................ | H04N 5/783 |
| | | | | 386/E5.052 |
| 2012/0005366 A1 | 1/2012 | Ma et al. | | |
| 2013/0294526 A1 | 11/2013 | Thornberry | | |
| 2017/0054822 A1* | 2/2017 | Gilson | ................. | G11B 27/005 |
| 2018/0034873 A1* | 2/2018 | Brown | .................. | H04L 67/146 |

(Continued)

FOREIGN PATENT DOCUMENTS

| | | |
|---|---|---|
| CN | 109819317 A | 5/2019 |
| WO | 2004068855 A1 | 8/2004 |

OTHER PUBLICATIONS

International Search Report and Written Opinion for International Application No. PCT/US2024/018776, dated May 28, 2024 (May 28, 2024)—12 pages.

*Primary Examiner* — Thai Q Tran
*Assistant Examiner* — Stephen R Smith
(74) *Attorney, Agent, or Firm* — CM Law; Stephen J. Weed

(57) ABSTRACT

A media player providing real time rewind playback of a played media file having segments of frames. A last segment N of the played media file is cached and rendered on a device, such as a mobile device, then a previous segment N−1 is cached and rendered, and the process continues until there are no more segments of the played media file to cache and render. Only a segment of the played media file is cached at a time, rather than the whole media file, such that the played media file can be replayed on the fly.

14 Claims, 8 Drawing Sheets

(56) References Cited

U.S. PATENT DOCUMENTS

| | | | |
|---|---|---|---|
| 2018/0213015 A1* | 7/2018 | Jain | H04L 65/80 |
| 2020/0145701 A1* | 5/2020 | Liu | H04N 21/84 |
| 2022/0189418 A1 | 6/2022 | Banik et al. | |

* cited by examiner

40

42 — Begin rewind playback

44 — Cache last segment N when user begins rewind play back

46 — Render segment N and cache segment N-1

48 — Render segment N-1 and cache segment N-2

50 — Repeat until no segments are available to be rendered

50

Estimated memory = width * height * LGOP * 4

Estimated memory >= 100MB ?

No

Yes

Adjust resolution to fit memory constraint

REAL TIME REWIND PLAYBACK

TECHNICAL FIELD

The present subject matter relates to rewind playback of a media file.

BACKGROUND

Conventional processing of videos for rewind playback takes a long time. If users make any changes to the original media and want to see the effect in rewind playback, new processing techniques are needed to improve the experience.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1:
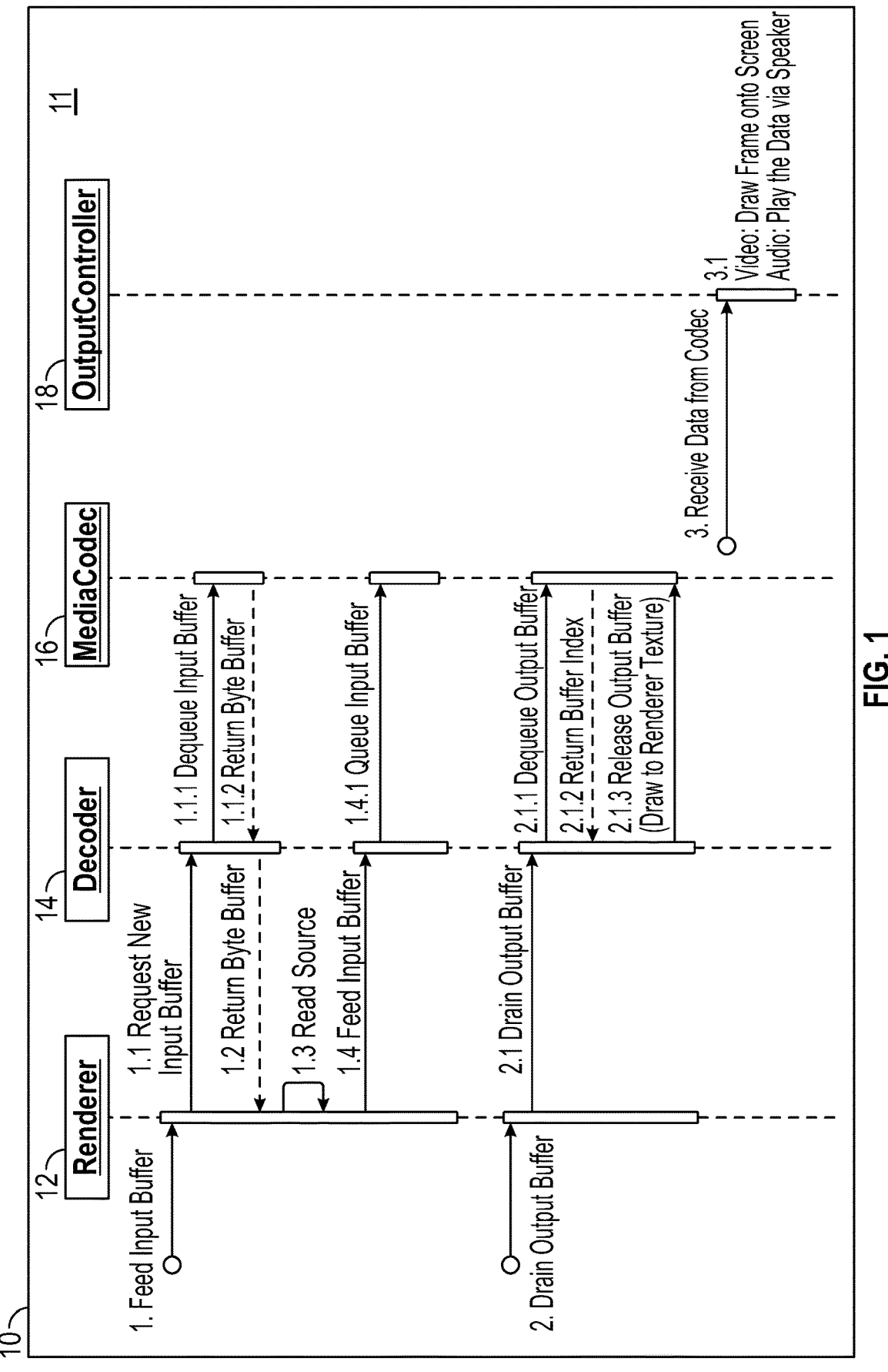
Figure 2:
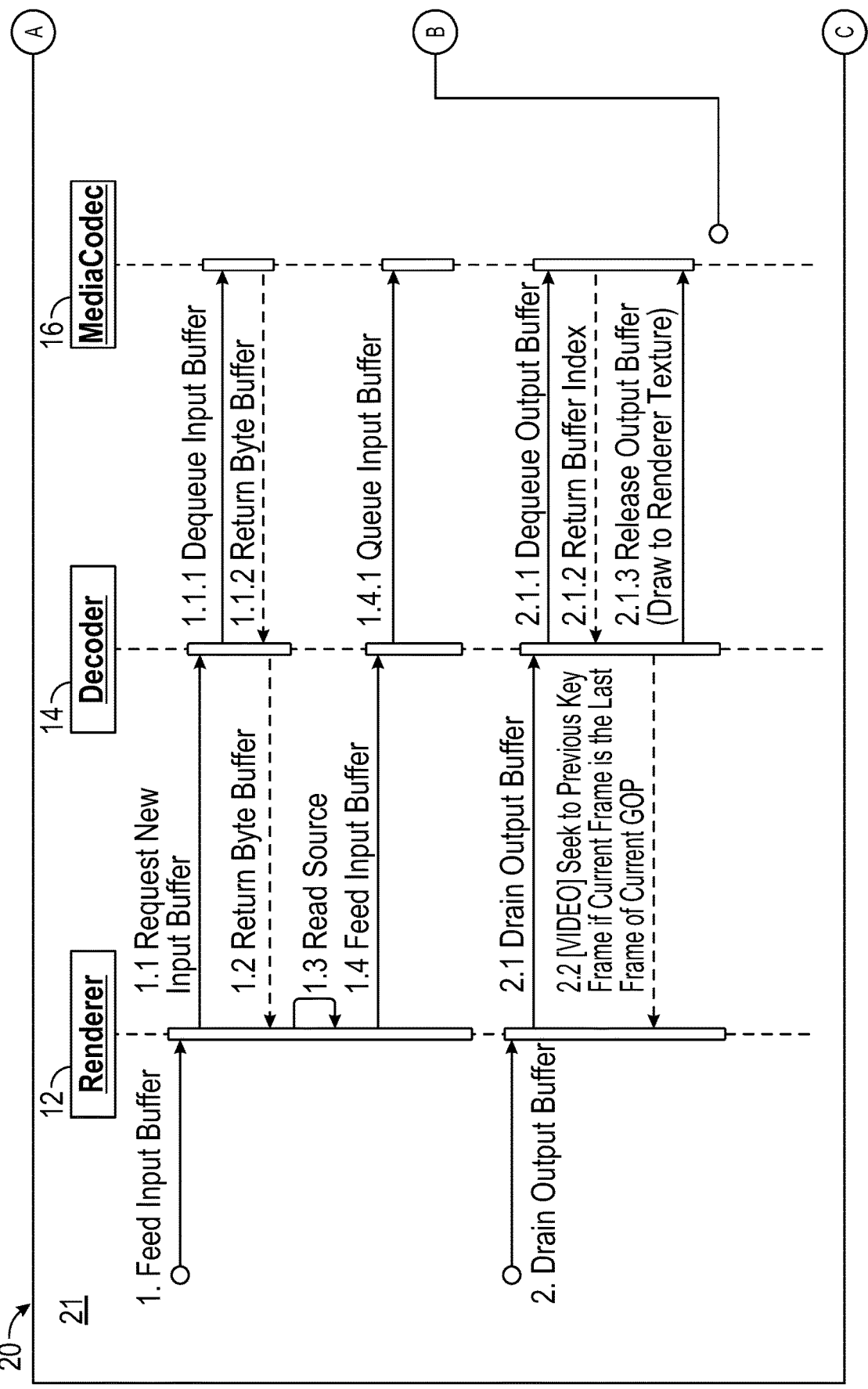
Figure 2:
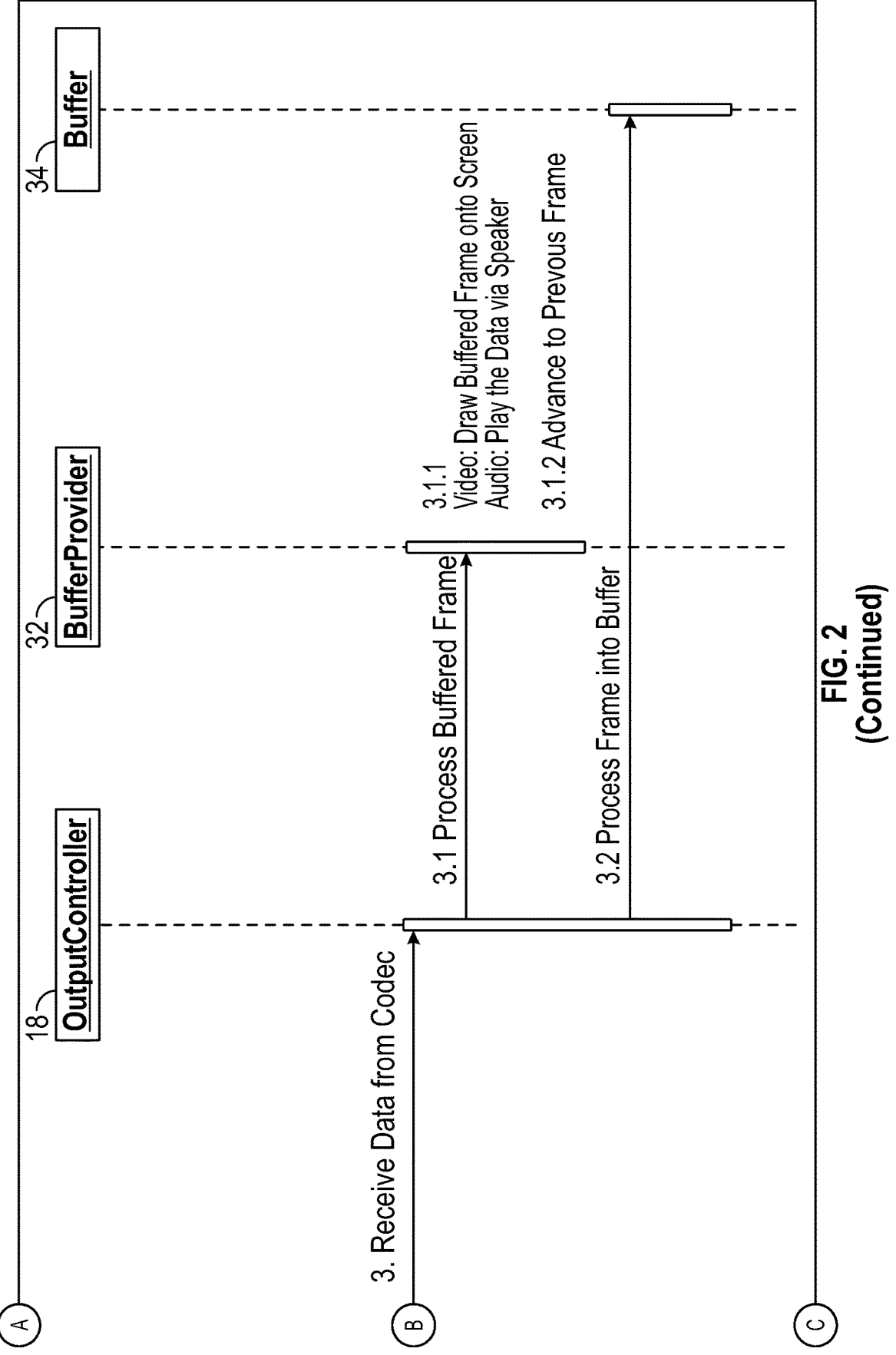
Figure 3:
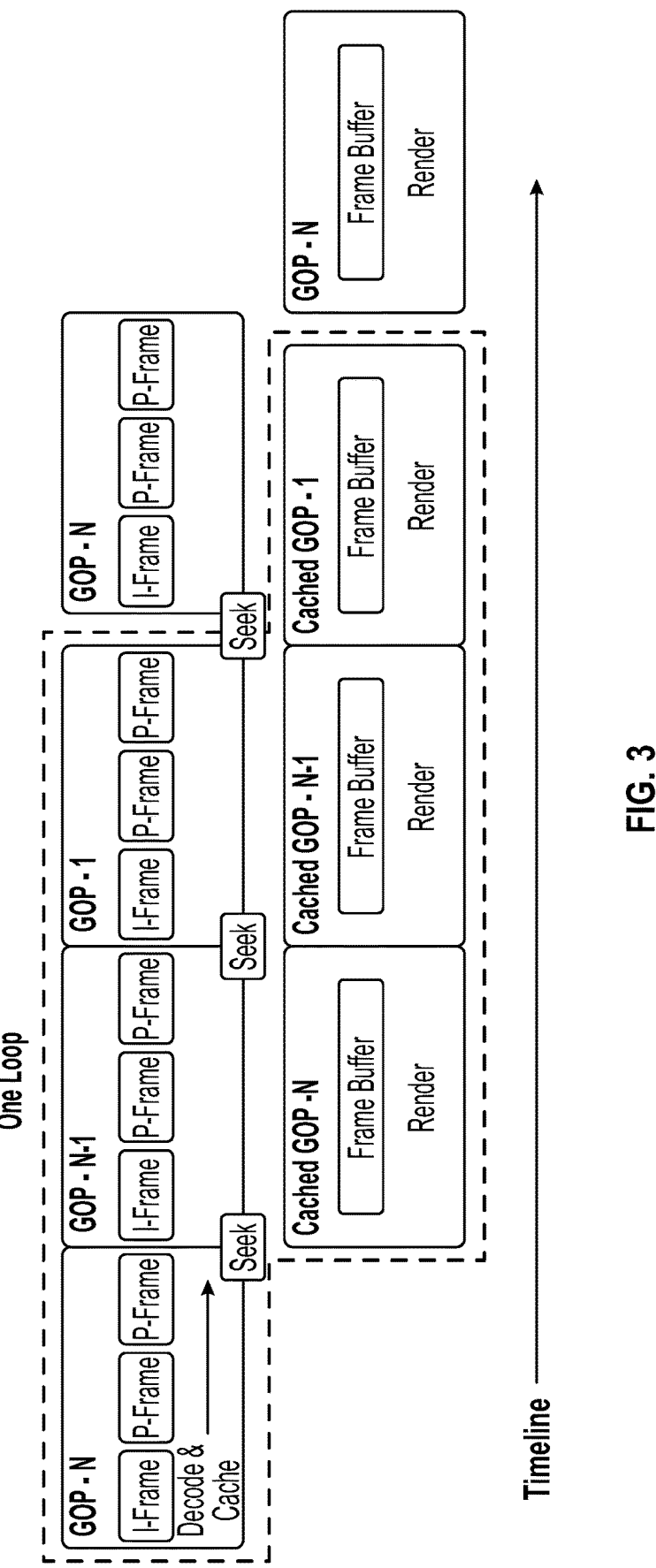
Figure 4:
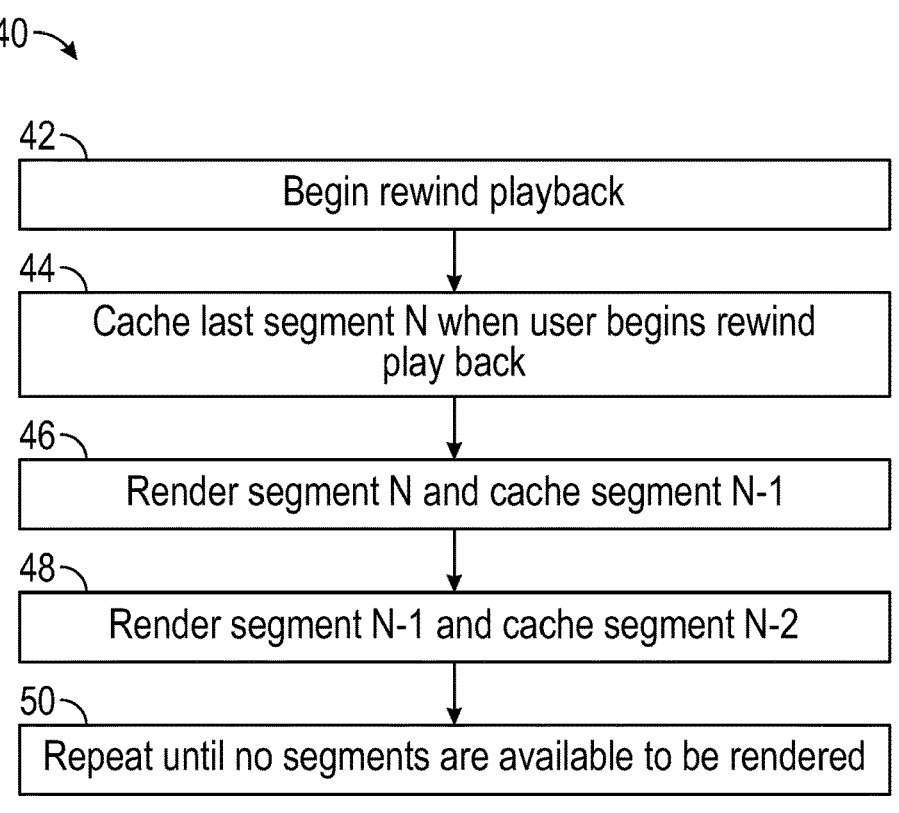
Figure 5:
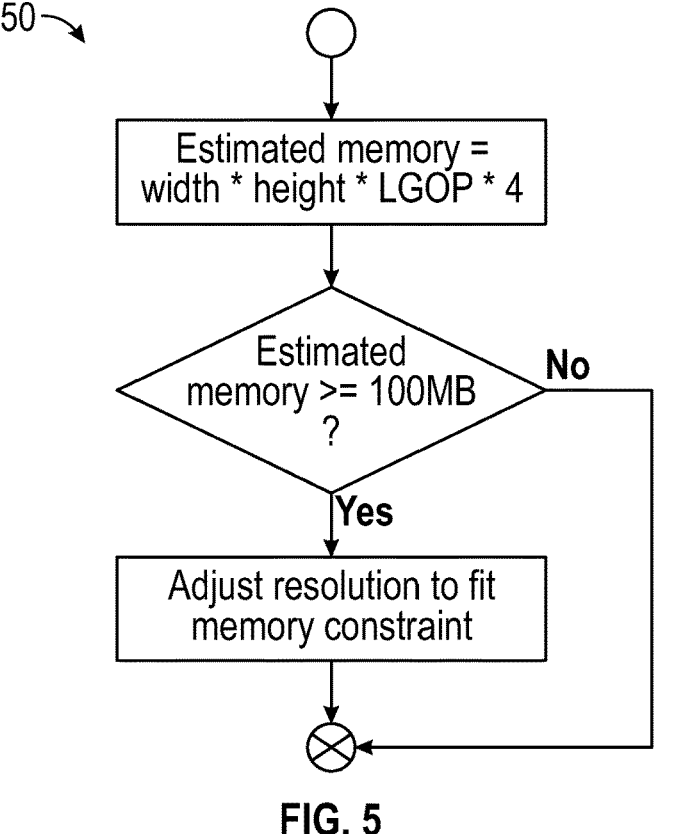
Figure 6:
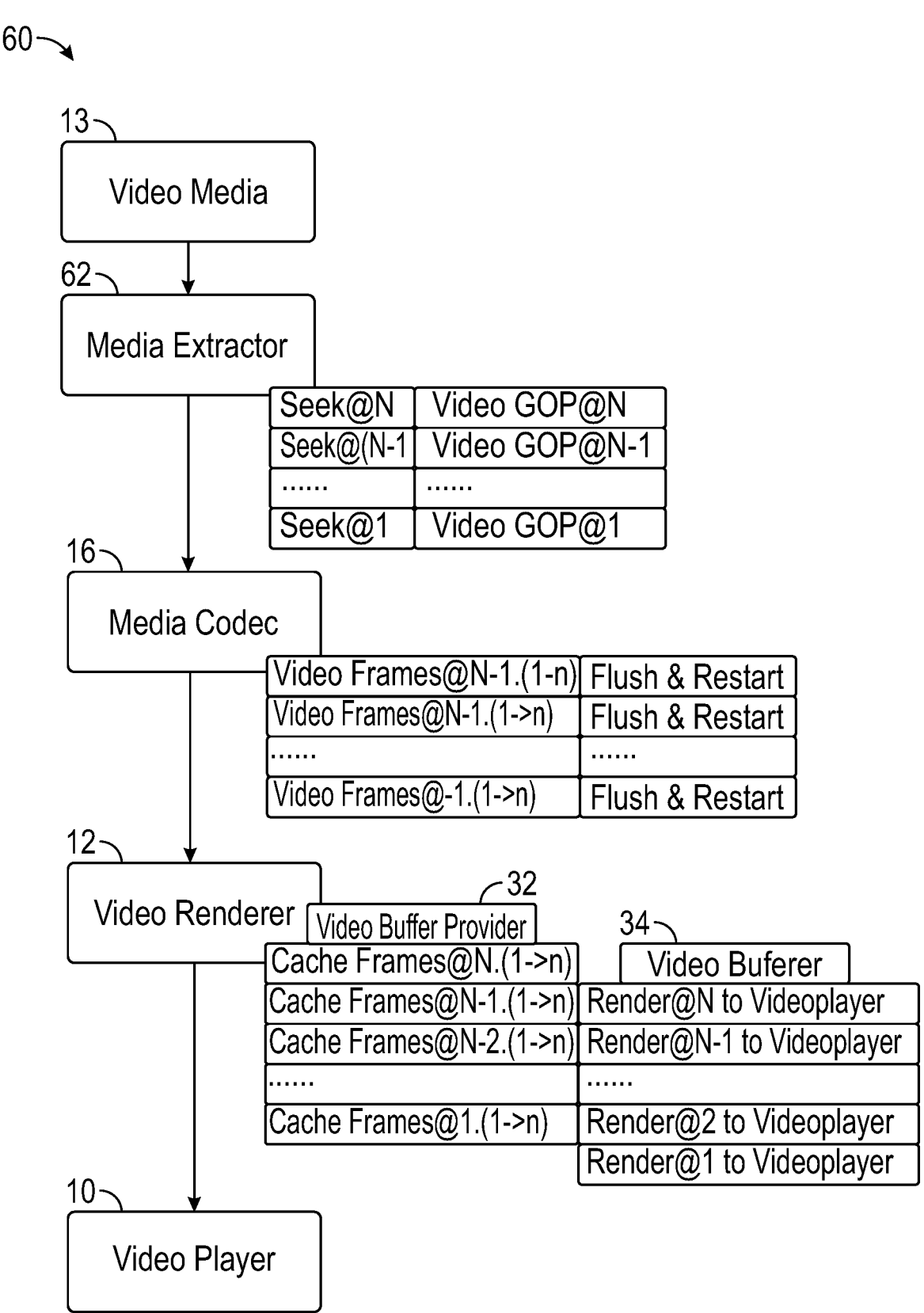
Figure 7:
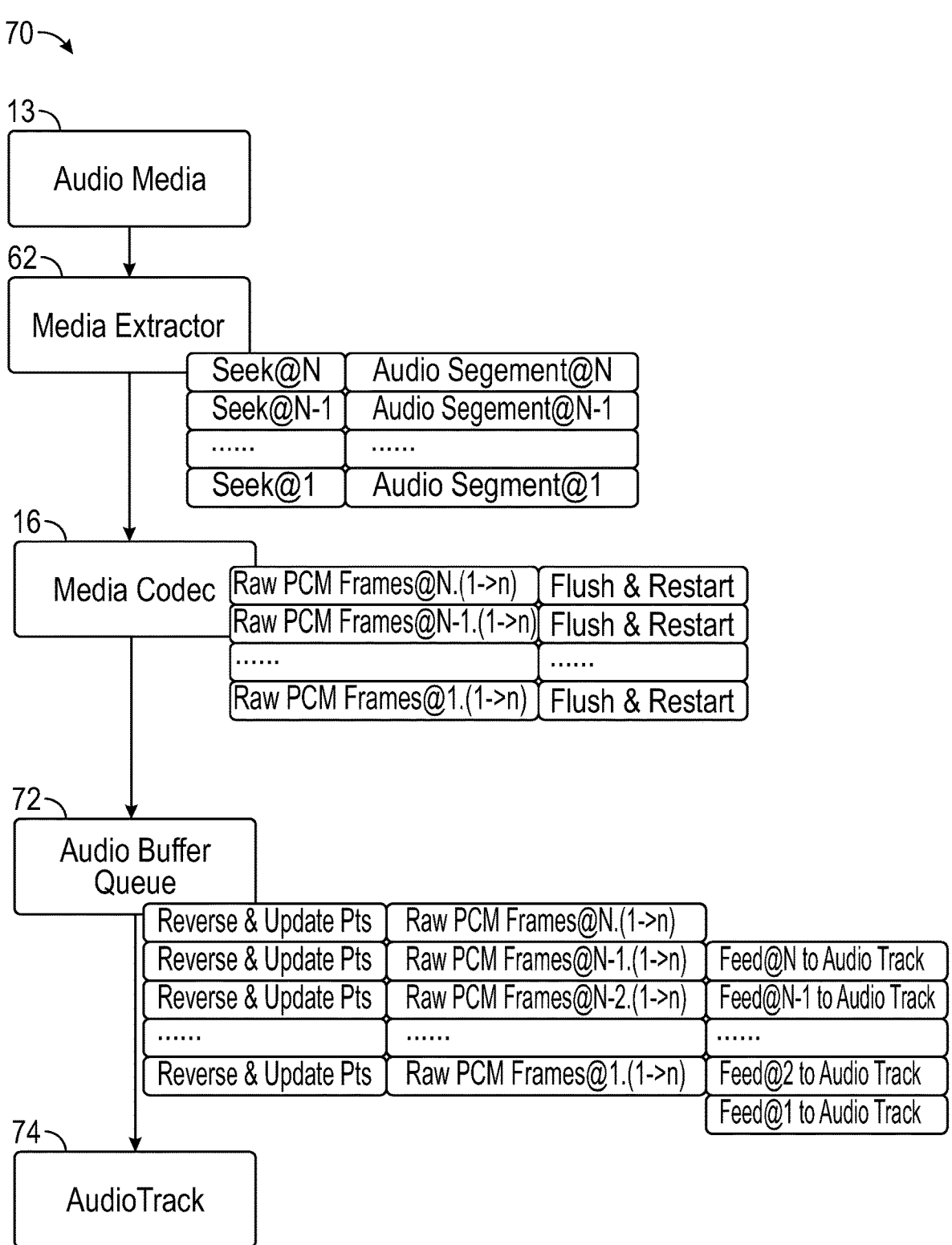
Figure 8:
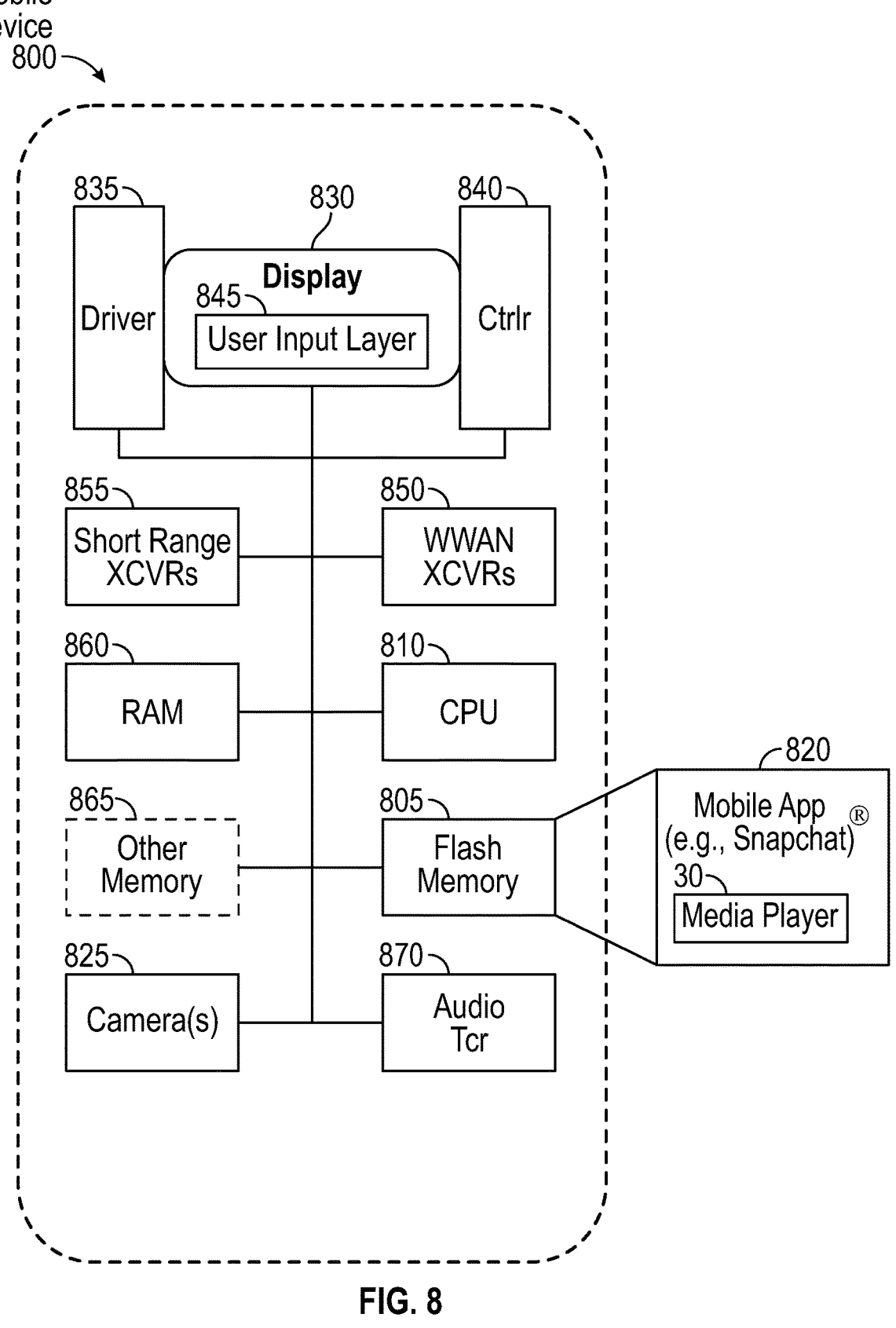

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1 is a block diagram of a media player with process flow illustrating a normal playback flow of a media file including audio and video;

FIG. 2 is a flow diagram illustrating top-level processing flow of a new rewind playback feature;

FIG. 3 is a block diagram of a media player with process flow illustrating a rewind playback flow rendering playback in real-time (on-the-fly);

FIG. 4 is a flowchart illustrating the rewind playback flow of FIG. 3;

FIG. 5 is a block diagram of a cache frame resolution downsampled to fit a memory constraint;

FIG. 6 is an implementation diagram of video extraction and caching in a video implementation of rewind playback;

FIG. 7 is an implementation diagram of audio extraction and caching in an audio implementation of rewind playback; and FIG. 8 is a block diagram of electronic components of a mobile device configured for use with the media player 30 of FIG. 3.

DETAILED DESCRIPTION

A media player providing real-time rewind playback of a played media file having segments of frames to, for example, improve audio and video editing experiences. A last segment N of the played media file is cached and rendered on a device, such as a mobile device, then a previous segment N−1 is cached and rendered, and the process continues until there are no more segments of the played media file to cache and render. Only a segment of the played media file is cached at a time, rather than the whole media file, such that the played media file can be replayed on-the-fly.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings.

Setup of Problem

Video Compression Picture Types

Three types of pictures (or frames) are used in video compression: I, P, and B frames. An I-frame (Intra-coded picture) is a complete image, which can be compressed independently, e.g., a JPG image. A P-frame (Predicted picture) is the image that contains only the difference from the previous frame. For example, in a scene where a car moves across a stationary background, only the car's movements need to be encoded. The encoder does not need to store the unchanging background pixels in the P-frame, thus saving space. A B-frame (Bidirectional predicted picture) is the frame that contains differences between the current frame and both the preceding and following frames. This saves more space than the P-frame. A GOP (Group of Pictures) is a set of frames in the order I, P and B frames are arranged. The GOP usually contains one I-frame at the beginning, and several P-frames and B-frames follow.

A media coder/decoder (MediaCodec) is a component that encodes/decodes the frames. In an example, a codec can be either configured as a decoder codec or an encoder codec, which accepts input data to generate output data. Internally, the codec uses buffers to track input and output, and processes data asynchronously. A regular process to use a codec is a Caller requests an empty buffer from the codec, fills the buffer with video frame data, and then sends the buffer back to the codec. The codec processes the buffer data with a given format and generates an output buffer. A Caller requests a filled output buffer, and then reads the contents and releases the buffer back to the codec. In the playback scenario, the MediaCodec is configured as a decoder codec for decoding the media format.

Regular Playback

A player stack for a mobile device, such as a player stack created by Snap Inc. of Santa Monica, California on an Android® OS based on ExoPlayer®, includes four components: MediaSource, Renderer, LoadControl and TrackSelector. ExoPlayer® is an open-source application-level media player for Android®. ExoPlayer® provides an alternative to the Android® MediaPlayer API for playing audio and video on a mobile device, such as a smart phone. This disclosure includes customization of the media player, such as ExoPlayer®, focused on the renderer that builds the process to decode an audio and video frame with a MediaCodec and then render the frame onto a screen.

A media player 10 having a normal playback flow 11 for audio and video is shown in FIG. 1. Renderer 12 is a controller for the playback pipeline, where renderer 12 periodically fetches the encoded data from a media file 13, sends the fetched data to decoder 14, and renders the frame. Decoder 14 is a controller of MediaCodec 16 that decodes the data read from renderer 12 with MediaCodec 16. In one example, MediaCodec 16 decodes an encoded data trunk with the given media format. The encoded data trunk includes multiple encoded frames of a media file. Output controller 18 has a video output that outputs the video frame to SurfaceTexture of Android®, and an audio output that outputs the audio raw pulse code modulated (PCM) data to AudioTrack of Android®, which outputs the PCM data to a speaker of the mobile device to provide audio.

Rewind Playback

There are several technical challenges for rewind playback. These include video compression picture type constraints and MediaCodec constraints, which are now addressed.

Video compression picture type constraint: The I-frame should be decoded first and then the P-frame and B-frame because it is impossible to decode the frame from P-frame or B-frame in reverse order unless the I-Frame from the GOP is provided to the decoder.

MediaCodec constraint: MediaCodec 16 needs to process data that is adjacent to previously submitted data, otherwise the codec needs to be flushed. This is because of the frame inter-dependence.

The media player 10 and renderer 12 do not support fetching the encoded frames in reverse order. The media player 10 and renderer 12 read the media in a chronological forward order.

The AudioTrack processes the audio "frames" based on the pass-in order. An audio frame is a block of bytes of minimum duration of audio that the encoder uses to compress the audio.

Given these challenges for rewind playback, the media file 13 cannot be directly read and decoded in reverse order. One approach for rewind playback is to cache all video and audio frames of the media file 13 into memory, and then read the video and audio frames from memory to render, but this approach has significant waiting times and a uses a large portion of memory. For example, for 720p video (duration=10 seconds, fps=30, so 300 frames in total), the resolution is 1280*720 (each frame is composed by red-green-blue-white (RGBW)), so each frame consumes 1280*720*4 Byte=3.6 MB memory. For 10 s video, it takes 3.6*300=1080 MB≈1G memory. Caching can only be run on some high-end devices, but on mid to low end devices it causes severe Out Of Memory issues. Assuming loading one frame to memory takes 10 milliseconds, a 10 second 30 fps video takes 10 milliseconds*300=3000 milliseconds=3.0 seconds to load all the frames, which is a poor editing experience.

Solution to Problem

To achieve rewind playback of played media on the fly, in real time, with the described challenges, the media player, such as ExoPlayer®, is modified with a new media processing flow for rewind playback.

FIG. 2 is a block diagram of a media player 20 having a process flow 21 implemented on, for example, a mobile device. The process flow 21 illustrates a new rewind playback flow for rendering playback in real-time (on-the-fly). The media player 20 includes the renderer 12, the decoder 14, the MediaCodec 16, the output controller 18, a buffer provider 32, and a buffer 34. The video buffer 34 maintains a video frame pool that is used to cache frames. The video frame pool is a dedicated working memory and cache within memory of the mobile device that increases performance by allowing direct access to the video frames. The video buffer provider 32 is configured to retrieve frames from video buffer 34, e.g., under output controller 18.

At step 1, a cache mechanism of media player 20 caches a segment of the played media file, such as a GOP, where the cache mechanism does not need to cache the whole media file 13. Media player 20 caches the played segments by feeding and draining the played segments into input buffers of the MediaCodec 16 via decoder 14. At step 1.1, the renderer 12 requests a new input buffer of the MediaCodec 16 via decoder 14. At step 1.2, the MediaCodec 16 returns a byte buffer to renderer 12 via decoder 14 (through dequeue of the input buffer at step 1.1.1 and returning the byte buffer at step 1.1.2). At step 1.3, the renderer 12 reads source data from the media file 13. At step 1.4, renderer 12 feeds the read data into the input buffer of MediaCodec 16 (through queue the input buffer at step 1.4.1). The decoding process of MediaCodec 16 is asynchronous.

At step 2, renderer 12 drains the frames from an output buffer of MediaCodec 16 (through dequeue the output buffer at step 2.1.1, return the buffer index at step 2.1.2 and release the buffer of MediaCodec 16 at step 2.1.3). If the current frame is the last frame of a current GOP, the renderer 12 will instruct media player 20 to seek to the previous segment.

At step 3 of FIG. 2, output controller 18 receives the decoded video frames from MediaCodec 16. At step 3.1, buffer provider 32 processes the buffered frames. At steps 3.1.1, for video, buffer provider 32 retrieves the frames of video from buffer 34 and presents buffered frames onto a screen of the mobile device and, for audio, buffer provider 32 plays data from the buffer 34 via a speaker of the mobile device. At step 3.1.2, buffer provider 32 advances to the previous frame. At step 3.2, output controller 18 processes the decoded video frames into buffer 34.

FIG. 3 is a flow diagram illustrating an example flow of the renderer 12 and use of cache (e.g., in memory 860 of mobile device 800; FIG. 8) for the new rewind playback feature implemented in a media player 30. The cache mechanism does not need to cache the whole media file 13. Renderer 12 caches the played segments by feeding and draining the played segments into input buffers of the MediaCodec 16 via decoder 14. The cache mechanism reduces the amount of caching by only caching what is necessary rather than the entire media file, thereby dramatically reducing the memory usage and load time for the rewind playback feature described herein.

While buffer provider 32 caches frames of segments of the played portion of media file 13, video and audio renderer 12 renders the cached video and audio data of the previous GOP simultaneously. When decoder 14 decodes the last frame of the current GOP or the last frame of the media file 13, decoder 14 signals the media player 20 to seek the start point of the previous GOP to begin decoding the previous GOP. To seek the start point, the media player 20 finds the timestamp of the first frame in previous GOP. Next, the media player 20 calls the media extractor to seek the exact frame for the given timestamp. Next, the media player 20 flushes the codec and restarts decoding from the given timestamp.

At the beginning of the rewind playback, as shown at 36, render 12 caches GOP 4, which may take 10 ms*30=300 ms. For example, when caching the 120th frame (last frame of GOP 4), decoder 14 seeks to the $61^{st}$ frame, which is the start point of GOP 3 (N–1) as shown at 36. Renderer 12 next renders GOP 3 from the 90th frame to the 61st frame on the display using, for example, SurfaceTexture of Android®, to achieve the rewind playback effect. While the render 12 renders GOP 3, renderer 12 also caches GOP 2 from the 31st frame to the 60th frame. When the cache reaches the 60th frame, the renderer 12 seeks the 31st frame, the start point of GOP 2 (N–2) as shown at 37. Renderer 12 then renders GOP 2 from the $60^{th}$ frame to the 31st frame on the display at output controller 18, e.g., using SurfaceTexture. While the render 12 renders GOP 2, renderer 12 also caches GOP 1 from the $1^{st}$ frame to the $30^{th}$ frame. When the cache reaches the $30^{th}$ frame, the renderer 12 seeks the $1^{st}$ frame, the start point of GOP 1 (N–3) shown at 38. The rewind playback ends when there are no more GOPs to render on the display.

FIG. 4 depicts a flowchart 40 of an example method illustrating steps for performing rewind playback. The cache mechanism described above with reference to FIG. 3 is used to cache a segment of the played media file 13, such as a GOP, but does not need to cache the whole media file 13. This reduces caching, which dramatically reduces the memory usage and load time of the rewind playback described herein.

At block 42, the mobile device initiates rewind playback. In an example, a mobile device with a touchscreen initiates rewind playback of an application in response to a swiping gesture from a user to access the rewind filter during display of GOP N, where N=4 in the example used herein (anywhere between the $91^{st}$ to $120^{th}$ frame of the media file 13). The application generates a signal in response to the swiping gesture that signals decoder 14 to respond.

At block 44, the renderer 12 caches the last segment N in buffer 34 using buffer provider 32. A segment is a predetermined number of frames that may correspond to the fps of the system, such as 30 frames per second. In an example, renderer 12 groups the frames into segments based on the fps of the system (e.g., in 30 frame segments) and assigns each frame an index number. Renderer 12 determines the last frame of a segment based on the index number of the frame and the fps of the system (which corresponds to the total number of frames in the segment). In an example, at the beginning of the rewind playback, renderer 12 caches segment GOP 4 (frames 91-120; FIG. 3). When caching the $120^{th}$ frame (last frame of GOP 4), renderer 12 directs decoder 14 to the first frame of the prior segment, e.g., the $61^{st}$ frame, which is the start point of GOP 3 (N–1), using the assigned index.

At block 46, render 12 renders segment N and caches segment N–1. Renderer 12 renders GOP 4 from the $120^{th}$ frame to the $91^{st}$ frame (previously cached at block 44) in revers chronological order on the display of the mobile device to achieve the rewind playback effect. In an example, renderer 12 renders segment N by outputting the video frames of segment N in reverse chronological order to output controller 18 (e.g., SurfaceTexture of Android®). As GOP 4 is being rendered on the display (e.g., concurrently), renderer 12 also caches GOP 3 ($61^{st}$ frame to the $90^{th}$ frame) so that GOP 3 is ready to be rendered after the GOP 4 is rendered to provide real-time playback without delay. In some examples, renderer 12 drops each frame from the cache if the frame has been rendered on the display, thereby freeing space to cache new frames.

At block 48, render 12 renders segment N–1 and caches segment N–2. In an example, renderer 12 renders GOP 3 ($90^{th}$ frame to the $61^{st}$ frame) on the display to achieve the rewind playback effect. As GOP 3 is being rendered on the display (e.g., concurrently), renderer 12 also caches GOP 2 from the $31^{st}$ frame to the $60^{th}$ frame so that GOP 2 is ready to be rendered after the GOP 3 is rendered. When renderer 12 retrieves the $90^{th}$ frame from cache for rendering, the renderer 12 caches the first frame of the prior segment ($31^{st}$ frame), which is the start point of GOP 2 (N–2).

At block 49, renderer 12 repeats the process until playback ends. In an example, renderer 12 renders GOP 2 from the $60^{th}$ frame to the $31^{st}$ frame on the display. As GOP 2 is being rendered on the display (e.g., concurrently), renderer 12 also caches GOP 1 from the $1^{st}$ frame to the $30^{th}$ frame so that GOP 1 is ready to be rendered after GOP 2 is rendered. When the renderer 12 retrieves the $60^{th}$ frame from cache for rendering, as determined by the renderer 12 using the segment number and index value of the frame, the renderer 12 caches the first frame of the prior segment ($1^{st}$ frame), which is the start point of GOP 1 (N–3). The rewind playback ends when there are no more GOPs to render.

Memory Estimation

To avoid potential memory issues (e.g., Out Of Memory), in one example, the renderer 12 limits memory usage for caching by buffer 34 to a memory constraint (e.g., 100 MB). The renderer 12 monitors the memory usage and, if the necessary memory needed for caching is greater than the memory constraint, the renderer 12 signals the MediaCodec 16 to downsample the frame resolution for caching to fit the memory constraint. FIG. 5 depicts a flowchart 50 of example steps addressing memory constraints. At step 52, the renderer 12 determines an estimated memory size. In an example, the estimated memory size is calculated using the equation: estimated memory size equals video frame width (in pixels)*video frame height (in pixels)*LGOP*4, where LGOP is short for Largest GOP size. The GOP sizes of the media are not all the same, so the renderer 12 selects the largest GOP size the media player is configured to handle. At step 54, the renderer 12 compares the determined estimated memory size to the memory constraint (e.g., 100 MB). At step 56, which is reached if the estimated memory is greater than or equal to the memory constraint, the renderer 12 signals the MediaCodec 16 to down sample frame resolution (e.g., by 10 percent). Otherwise, frame resolution is not adjusted if the estimated memory is less than the memory constraint.

FIG. 6 depicts an implementation diagram 60 for describing video extraction and caching in a video implementation of the rewind playback effect. A media extractor 62 extracts an encoded data trunk that includes the encoded video frames from the video media 13. Typically, an encoded data trunk includes multiple video frames. The media extractor 62 extracts the encoded video data from video media 13 on a segment-by-segment basis using a conventional seek instruction. Media extractor 62 is a program file that is integrated into renderer 12 or as a separate program file controlled by renderer 12. In an example, media extractor 62 extracts the encoded video data using a conventional "seek" instruction.

MediaCodec 16 decodes the encoded data trunk, and outputs the video frames to output controller 18, e.g., using SurfaceTexture of Android®. In an example, MediaCodec 16 decodes the frames from the buffer on a segment-by-segment basis and flushes and restarts the buffer after each segment. Renderer 12 receives the video frames, renders the frame to video buffer 34, and draws the cached frame onto a display of the mobile device. As set forth above, the video buffer provider 32 retrieves the frames from video buffer 34. The video buffer 34 maintains a video frame pool that is used to cache the frames. The video frame pool is a dedicated working memory and cache that increases performance by allowing direct access of the video frames. Media player 30 draws the frames onto the screen of a mobile device, such as eyewear or a smart phone.

FIG. 7 depicts an implementation diagram 70 for describing audio extraction and caching in an audio implementation of the rewind playback effect. Media extractor 62 extracts an encoded data trunk that includes the encoded audio frames from the media file 13 on a segment-by-segment basis as described above with reference to FIG. 4 and sends the extracted audio data to MediaCodec 16 for decoding. Typically, an encoded data trunk includes multiple audio frames. In an example, media extractor 62 extracts the encoded audio data from cache using a conventional "seek" instruction.

MediaCodec 16 decodes the encoded data trunk and outputs the raw pulse code modulated (PCM) data. In an example, media extractor 62 flushes and restarts the buffer after processing each segment. Audio track 74 of media file 13 outputs the PCM data to the smart device. An audio buffer queue 72 reverses every byte in the audio segment and organizes the audio segments in continuous order. Media player 30 plays audio based on the organized audio segments.

In an example, the whole audio track is split into each audio segment. (e.g., segment 1>2>3).

Media extractor 62 extracts the encoded audio trunk from each audio segment in reversed order. (e.g., segment 3>2>1).

Each segment as an encoded data trunk is decoded by MediaCodec 16 and outputs as raw pulse code modulated (PCM) data. (e.g., segment 3: frame 1>2>3).

A segment of PCM data is reversed and cached by the audio buffer queue 72. As a result, the PCM data are organized in a continuous and reversed order. (e.g., segment 3: frame 3>2>1).

Media player 30 plays audio based on the organized audio segments. (e.g., segment 3 (frame 3>2>1)>2>1).

In an example use, the rewind playback techniques described herein may be used in video editing as a motion filter (e.g., in the Preview page on Snapchat® Android® available from Snap Inc. of Santa Monica, California). In such an implementation, a user of an application such as Snapchat Android on a mobile device takes a video in the Camera page and selects the Preview page. On the Preview page, the user selects the rewind playback filter from available filters using a swiping gesture on the display of the mobile device. In response to selection of the rewind playback filter, the application plays the video in real time in a reverse order.

FIG. 8 is a block diagram depicting a sample configuration of a mobile device 800 for use with the media player 30 of FIG. 3. Mobile device 800 may include a flash memory 805 that stores programming to be executed by the CPU 810 to perform all or a subset of the functions described herein. The mobile device 800 may further include a camera 825 that comprises one or more visible-light cameras (visible-light cameras with overlapping fields of view) or at least one visible-light camera and a depth sensor with substantially overlapping fields of view. Flash memory 805 may further include multiple images or video, which are generated via the camera 825.

The mobile device 800 may further include an image display 830, a mobile display driver 835 to control image display 830, and a display controller 840. In the example of FIG. 8, image display 830 may include a user input layer 845 (e.g., a touchscreen) that is layered on top of or otherwise integrated into the screen used by the image display 830. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example, and the subject technology as described herein is not intended to be limited thereto. For purposes of this discussion, FIG. 8 therefore provides a block diagram illustration of the example mobile device 800 with a user interface that includes a touchscreen input layer 845 for receiving input (by touch, multi-touch, or gesture, and the like, by hand, stylus, or other tool) and an image display 830 for displaying content.

As shown in FIG. 8, the mobile device 800 includes at least one digital transceiver (XCVR) 850, shown as WWAN (Wireless Wide Area Network) XCVRs, for digital wireless communications via a wide-area wireless mobile communication network. The mobile device 800 also may include additional digital or analog transceivers, such as short-range transceivers (XCVRs) 855 for short-range network communication, such as via NFC, VLC, DECT, ZigBee, BLUETOOTH®, or WI-FI®. For example, short range XCVRs 855 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 800, the mobile device 800 also may include a global positioning system (GPS) receiver. Alternatively, or additionally, the mobile device 800 may utilize either or both the short range XCVRs 855 and WWAN XCVRs 850 for generating location coordinates for positioning. For example, cellular network, WI-FI®, or BLUETOOTH® based positioning systems may generate very accurate location coordinates, particularly when used in combination. Such location coordinates may be transmitted to the mobile device 800 over one or more network connections via XCVRs 850, 855.

The transceivers 850, 855 (i.e., the network communication interface) may conform to one or more of the various digital wireless communication standards utilized by modern mobile networks. Examples of WWAN transceivers 850 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 850, 855 provide two-way wireless communication of information including digitized audio signals, still image and video signals, web page information for display as well as web-related inputs, and various types of mobile message communications to/from the mobile device 800.

The mobile device 800 may further include a microprocessor that functions as the central processing unit (CPU) 810. A processor is a circuit having elements structured and arranged to perform one or more processing functions, typically various data processing functions. Although discrete logic components could be used, the examples utilize components forming a programmable CPU. A microprocessor, for example, includes one or more integrated circuit (IC) chips incorporating the electronic elements to perform the functions of the CPU 810. The CPU 810, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 810 or processor hardware in smartphone, laptop computer, and tablet.

The CPU 810 serves as a programmable host controller for the mobile device 800 by configuring the mobile device 800 to perform various operations, for example, in accordance with instructions or programming executable by CPU 810. For example, such operations may include various general operations of the mobile device 800, as well as operations related to the programming for messaging apps and AR camera applications on the mobile device 800. Although a processor may be configured by use of hardwired logic, typical processors in mobile devices are general processing circuits configured by execution of programming.

The mobile device 800 further includes a memory or storage system, for storing programming and data. In the example shown in FIG. 8, the memory system may include flash memory 805, a random-access memory (RAM) 860, and other memory components 865, as needed. The RAM 860 may serve as short-term storage for instructions and data being handled by the CPU 810, e.g., as a working data processing memory. The flash memory 805 typically provides longer-term storage.

Hence, in the example of mobile device 800, the flash memory 805 may be used to store programming or instructions for execution by the CPU 810. Depending on the type of device, the mobile device 800 stores and runs a mobile operating system through which specific applications are executed. Examples of mobile operating systems include Google Android, Apple IOS (for iPhone or iPad devices), Windows Mobile, Amazon Fire OS (Operating System), RIM BlackBerry OS, or the like.

The mobile device 800 may include an audio transceiver 870 that may receive audio signals from the environment via a microphone (not shown) and provide audio output via a speaker (not shown). Audio signals may be coupled with video signals and other messages by a messaging application or social media application implemented on the mobile device 800.

The mobile device 800 may execute mobile application software 820 such as SNAPCHAT® available from Snap, Inc. of Santa Monica, CA that is loaded into flash memory 805.

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A media player for providing rewind playback of a played media file including a plurality of pictures (GOPs), the media player comprising:
a buffer configured to buffer the plurality of GOPs;
a media coder/decoder (CODEC) configured to decode the buffered GOPs including a GOP N, a prior GOP N–1 and a prior GOP N–2;
a presentation device; and
a renderer configured to receive the decoded GOPs from the CODEC, render the GOPs for display on the presentation device, and cache the rendered GOPs in the buffer, wherein the renderer is further configured to render the GOP N for display by the presentation device while caching the prior GOPs N–1 and N–2 in the buffer for subsequent presentation by the presentation device, wherein the renderer is configured to provide rewind playback of the prior GOPs N–1 and N–2 without the CODEC decoding the prior GOPs N–1 and N–2 again, wherein the renderer is configured to estimate memory usage of the buffer, compare the estimated memory usage to a memory constraint, and instruct the CODEC to down sample frame resolution when the estimated memory usage is equal to or greater than the memory constraint, wherein the estimated memory usage equals video frame width (in pixels) *video frame height (in pixels)*Largest GOP (LGOP) size*4.

2. The media player of claim 1, wherein the renderer caches the GOPs as video configured to be displayed on the presentation device.

3. The media player of claim 2, wherein the presentation device is a display comprising a touchscreen and the rewind playback is initiated in response to a gesture from a user on the touchscreen.

4. The media player of claim 1, wherein the renderer is configured to cache the GOPs with associated audio segments.

5. The media player of claim 1, wherein the renderer is configured to concurrently render the cached GOPs as video and corresponding audio data.

6. The media player of claim 1, wherein the renderer is configured to concurrently render the GOP N and the cached GOP N–1.

7. A method of operating a media player to provide rewind playback of a played media file including a plurality of groups of pictures (GOPs), the method comprising:
receiving a media file including the plurality of GOPs;
decoding the plurality of GOPs buffered in a buffer, the buffered GOPs including a GOP N, a prior GOP N–1 and a prior GOP N–2; and
rendering the decoded GOPs for display on a presentation device and caching the rendered GOPs in the buffer, wherein the GOP N is rendered for display by the presentation device while caching the prior GOPs N–1 and N–2 in the buffer for subsequent presentation by the presentation device;
wherein the renderer provides rewind playback of the prior GOPs N–1 and N–2 without decoding the prior GOPs N–1 and N–2 again; and
estimating memory usage of the buffer, comparing the estimated memory usage to a memory constraint, and instructing a media coder/decoder ODEC) to down-sample frame resolution when the estimated memory usage is equal to or greater than the memory constraint, wherein the estimated memory usage equals video frame width (in pixels)*video frame height (in pixels) *Largest GOP (LGOP) size*4.

8. The method of claim 7, wherein the caching comprises caching video frames of the GOPs displayed on the presentation device.

9. The method of claim 8, wherein the presentation device comprises a touchscreen and wherein the method further comprising initiating the rewind playback in response to a gesture by a user on the touchscreen.

10. The method of claim 7, wherein the caching comprises caching audio frames of the GOPs.

11. The method of claim 7, wherein the rendering comprises concurrently rendering cached video and audio data of the GOPs.

12. The method of claim 7, wherein the rendering comprises concurrently rendering the GOP N and caching the GOP N–1.

13. A non-transitory computer readable medium storing program code that, when executed by a processor, is operative to cause a media player to provide rewind playback of a played media file including a plurality of groups of pictures (GOPs) by performing the steps of:
receiving a media file including the plurality of GOPs;
decoding the plurality of GOPs buffered in a buffer, the buffered GOPs including a GOP N, a prior GOP N–1 and a prior GOP N–2;
rendering the decoded GOPs for display on a presentation device and caching the rendered GOPs in the buffer, wherein the GOP N is rendered for display by the presentation device while caching the prior GOPs N–1 and N–2 in the buffer for subsequent presentation by the presentation device;
wherein the renderer provides rewind playback of the prior GOPs N–1 and N–2 without decoding the prior GOPs N–1 and N–2 again; and estimating memory usage of the buffer, comparing the estimate memory usage to a memory constraint, and instructing a media coder/decoder (CODEC) to down sample frame resolution when the estimated memory usage is equal to or greater than the memory constraint, wherein the estimated memory usage equals video frame width (in pixels)*video frame height (in pixels) *Largest GOP (LGOP) size*4.

14. The non-transitory computer readable medium of claim 13, wherein the program code is operative such that the media player concurrently renders the GOP N and caches the GOP N−1.

\* \* \* \* \*